Feb. 12, 1946. W. H. FREYGANG Re. 22,721

FLUID MEDIUM DISPENSING APPARATUS

Original Filed Dec. 29, 1939 2 Sheets-Sheet 1

INVENTOR
Walter H. Freygang
BY J. William Carson
ATTORNEY

Feb. 12, 1946. W. H. FREYGANG Re. 22,721
FLUID MEDIUM DISPENSING APPARATUS
Original Filed Dec. 29, 1939 2 Sheets-Sheet 2
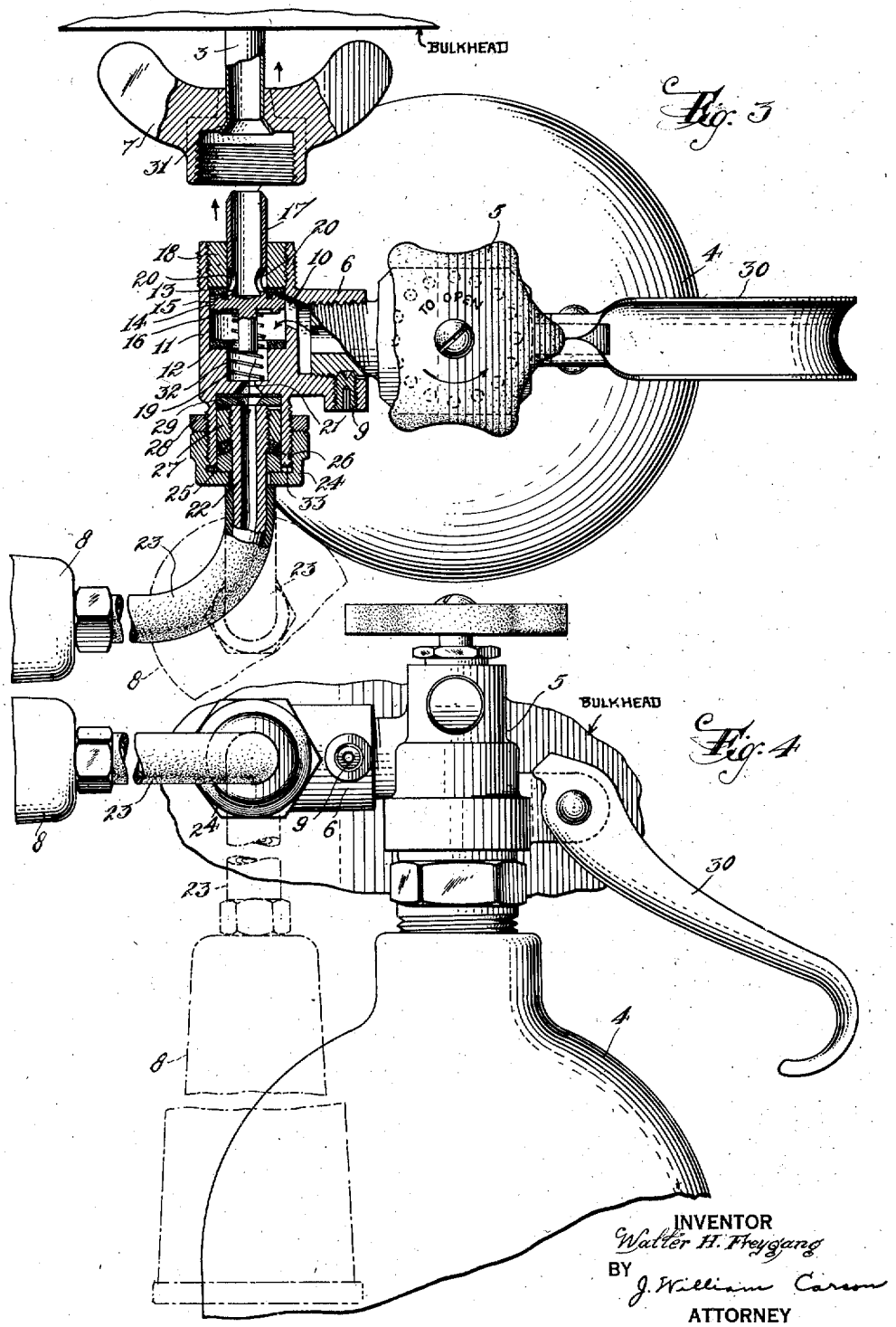
INVENTOR
Walter H. Freygang
BY J. William Carson
ATTORNEY Reissued Feb. 12, 1946 Re. 22,721

UNITED STATES PATENT OFFICE 22,721

FLUID MEDIUM DISPENSING APPARATUS

Walter H. Freygang, Essex Fells, N. J., assignor to Specialties Development Corporation, Bloomfield, N. J., a corporation of New Jersey Original No. 2,291,617, dated August 4, 1942, Serial No. 311,579, December 29, 1939. Application for reissue May 24, 1945, Serial No. 595,647

11 Claims. (Cl. 169—2)

This invention relates to portable fluid dispensing containers, and more particularly to containers adapted to be made a part of a fixed fluid distributing system without impairing their utility as portable sources of fluid medium.

This type of apparatus is useful in the fire extinguishing art, particularly in the case of small range fire extinguishing systems as used for example, on aircraft and motor vehicles. Ordinarily, a permanently located fire extinguishing conduit is provided which has suitable outlet nozzles in the vicinity of the hazard to be covered. A portable fire extinguisher is removably mounted at a place easily accessible to the operator and is conveniently connected to the distribution conduit so as to be easily disconnected from the conduit and to be used by the operator to direct the discharge of a fire extinguishing medium therefrom to any desired location.

This does not present any special problem in connection with fire extinguishers other than those employing liquid carbon dioxide. The latter fluid, it has been found, does not attain its maximum extinguishing efficiency unless discharged through so-called directional discharge shields or horns, disclosed in United States Patent No. 1,760,274, which have been adopted quite generally in connection with carbon dioxide fire extinguishers. In applying portable carbon dioxide fire extinguishers to fixed conduits as described above, the requirements for the horn interferes with the ease of disconnecting and using the extinguisher with the horn as a portable extinguisher.

An object of this invention is to provide a portable fire extinguisher which when connected to a fixed distribution conduit is an immediately available source of fluid medium therefor, and is also adapted to be quickly disconnected and to be instantly used as a portable extinguisher, notwithstanding the requirement for a horn.

A further object is to provide a connection between a portable fire extinguisher and a distribution conduit which will permit the passage of fluid medium from the container into the conduit when the container is connected thereto, and into a discharge horn, permanently secured to the container, only when the container is disconnected from the conduit.

These and other objects will become apparent as the invention is described in greater detail in connection with the accompanying drawings, wherein the invention is shown applied to an aircraft. This merely serves as an illustrative example, and the invention is not to be limited thereto.

In the drawings,

Figure 3 is a view similar to Figure 2, with the extinguisher shown disconnected from the conduit.

Figure 4 is an elevational view of the fire extinguisher shown in Figure 2, illustrating the general organization of the fire extinguisher.

Figure 1:
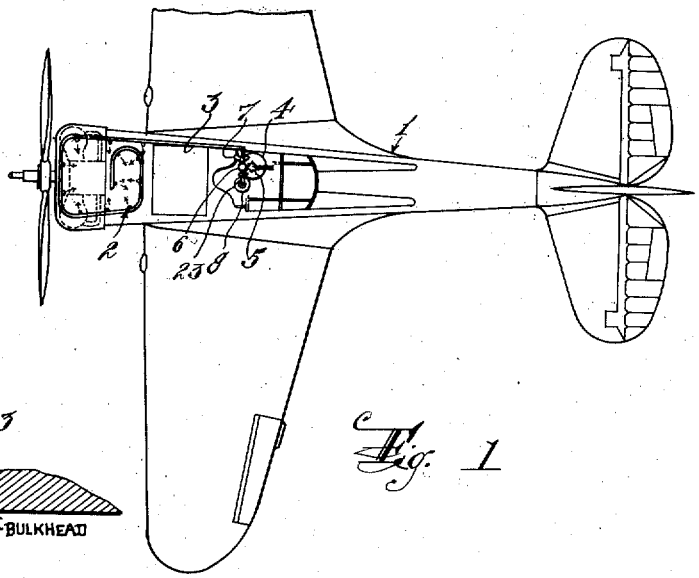
Figure 1 is a fragmentary plan view of an airplane, to which is applied a fire extinguishing system in accordance with the present invention.

Referring now to Figure 1, an airplane 1 is shown which is provided with a fire extinguishing system, wherein 2 indicates suitably perforate tubing surrounding the motor. A fluid medium supply conduit 3 leads from a portable high pressure fluid medium supply container 4, which may be conveniently and removably placed in the cockpit of the plane. The container 4 is controlled by a manually operable valve 5 and is connected to the conduit 3 by means of a discharge control member 6 and a wing nut 7. The other side of the member 6 is connected to a discharge horn 8.

Figure 2:
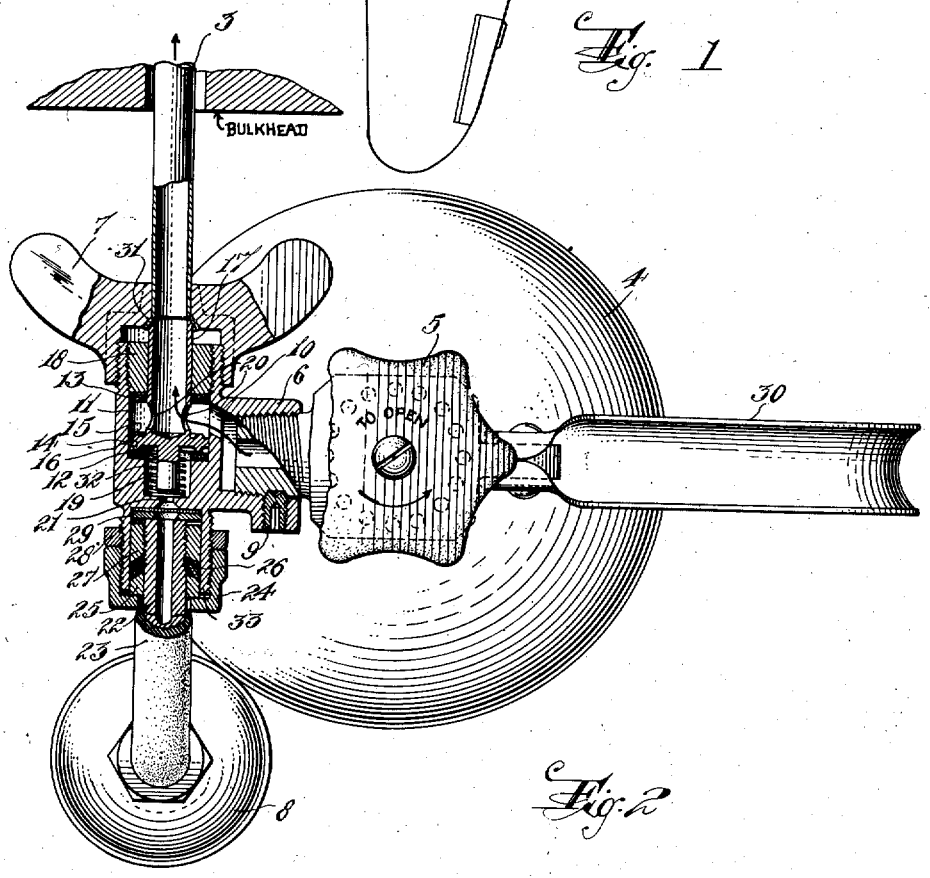
Figure 2 is a plan view, partially in section, of a portable fire extinguisher connected to an installed distribution conduit.

In Figure 2, an enlarged view is shown of the container 4 and the manner in which it is connected to the conduit 3. The discharge control member 6, which is of a T-form, is screwed onto the outlet end of the valve 5, and is held in place thereon by a set screw 9. A passage 10 in the member 6 leads from the outlet of the valve 5 into a chamber 11 formed in the member 6. A piston-like valve member 14 is reciprocably movable in the chamber and is formed on each side with oppositely positioned annular valve seats 15 and 16, which are adapted to seat on valve sealing washers 12 and 13, shown here as forming the top and bottom of the chamber 11. A hollow tubular member 17 projects from the valve member 14 through a bushing 18 to the outside of the member 6 to operatively engage with a flared end 31 of conduit 3. The bushing 18 is threadedly secured onto one end of the member 6 and at its inner end abuts the valve sealing washer 13. The wing nut 7 swivels over the flared end 31 of the conduit 3 and may be screwed onto one end of the member 6 to cause the piston-like valve member 14 to be forced toward the sealing washer 12 in opposition to a spring 19, which is located in a recess 32 of the member 6. In this position, suitable apertures 20 in the tubular member 17 coincide with the passage 10, thereby forming an unobstructed passageway for the fluid medium flowing from the container 4 into the discharge conduit 3, as indicated by the arrow.

Figure 3 shows the wing nut 7 and the conduit 3 disconnected from the discharge control member 6. The spring 19 is here shown forcing the piston-like valve 14 from the washer 12 toward the washer 13. The passageway previously established through the tubular member 17 toward the conduit 3 is now sealed off, while a passageway is established from the container 4 and the valve 5 via the passage 10, the central opening in the sealing washer 12, an orifice 21, and a passage 22 in a nipple 23 leading toward and connected to the discharge horn 8.

The nipple 23 preferably is a rigid piece of tubing and, in order to permit its manipulation by the operator, is secured to the outlet end of the member 6, by means of a swivel joint. The swivel joint comprises a cap 24; a ring formed member 25; a packing 26, which is slipped over the end of nipple 23; and a second ring-formed member 27 threaded onto the free end of the nipple 23. A lock nut 28 is placed over a sleeve-like outlet 33 of the member 6, whereupon the cap 24, upon being screwed in place, forces the members 25 and 27 together against the packing 26. This arrangement on the end of the nipple 23 forms a sealed bearing in the outlet 33, and permits the nipple to rotate in the socket thus formed. The nipple itself is seated against a gasket 29, which has also the function of providing a friction surface in the socket, so that the nipple and horn will stay in the position to which they have been rotated.

In Figure 4, which is an elevational view of the portable fire extinguisher 4, there is shown a handle 30 secured to the valve 5 for greater convenience in handling the extinguisher when used as a portable unit.

The operation of the apparatus described is self-evident from its construction. The apparatus, as shown in Figure 2 upon manipulation of valve 5, will operate as a fixed extinguishing system, no discharge being possible through horn 8, at that time. Should a fire occur at a place on the airplane not covered by the fluid medium distributing tubing 2, the operator, by merely loosening the wing nut 7 and lifting the container 4 from its support in the cockpit, is able upon opening of the valve 5, to direct the discharge of the fluid medium to any desired place by means of the swiveled discharge horn 8. As already apparent from the construction described above, disconnecting of the container from the fixed conduit 3 causes the piston like valve member 14 to be forced from its washer 12 to establish communication from the container 4 toward the horn 8, and causes the valve member to be forced against its washer 13 to cut off communication toward the outlet 17 of the member 6 and the fixed conduit 3. When the portable fire extinguisher is to be made a part of the fixed discharge system, the connective coupling of the container 4 through the member 6 to the conduit 3, by turning home the wing nut 7 over the free end of the member 6, causes the flared end 31 of the conduit to operatively engage the tubular member 17 projecting out of the free end of the member 6 and force the valve member 14 away from its washer 13 and toward its washer against the force of the spring 19, thereby establishing communication between the container 4 and the fixed conduit 3 through the hollow tubular member 17. The system is now again in readiness for covering any fires within reach of the installed tubing 2.

It will be seen from the above description of my invention that I have provided a convenient apparatus which almost instantaneously is alternatively usable either as a portable or fixed fire extinguishing system without impairment of the full advantages and improvements that have been incorporated and that are necessary for the operation of the apparatus in either of the alternatives.

While I have shown the invention applied to cover a specific hazard and in a specific form, I do not limit myself thereto, except as claimed in the following claims.

I claim:

1. In a fire extinguishing apparatus, the combination of a conduit, a container releasably confining a fire extinguishing medium, two-way-outlet means operatively connected to the container and providing two discharge outlets therefor, valve means controlling said outlets associated with said outlet means, valve actuating means associated with said valve means for normally closing one of the outlets, and means to couple said conduit to the normally closed outlet and thereby to open the normally closed outlet and to close the normally open outlet.

2. In a fire extinguishing apparatus, the combination of a fixed distribution conduit, a portable fire extinguishing medium container, two-way-outlet means operatively connected to the container and providing two discharge outlets therefor, a double seating valve in said outlet means, spring means associated with said valve normally urging it to close one of said outlets, fluid medium discharge directing means secured to the normally open outlet, and means to couple said conduit to the normally closed outlet and to open the normally closed outlet and to close the normally open outlet.

3. For use with a conduit having conduit coupling means, the combination of a portable fire extinguishing medium container, two-way-outlet means operatively connected to the container and providing two discharge outlets therefor, one of which is adapted for connective coupling to the conduit, valve means in said outlet means adapted to control said outlets, and actuating means for said valve means for normally closing said outlet adapted for connective coupling and for opening the outlet which is the other outlet, said valve means being operable upon application of the conduit coupling means to said normally closed outlet, to open the normally closed outlet and to close the normally open outlet.

4. For use with a conduit having conduit coupling means, a portable fire extinguishing apparatus comprising in combination a container releasably confining a fire extinguishing medium, two-way-outlet means operatively connected to the container and providing two discharge outlets therefor, one of which is adapted for connective coupling to the conduit, fluid medium discharge directing means secured to the other of said outlets, double seating valve means in said outlet means, spring means associated with said valve means normally urging said valve means to close said first and to open said second named outlet, said valve means, upon the application of the conduit coupling means to said first named outlet, being actuated against said spring means to open the first outlet and to close the second named outlet.

5. For use with a conduit having connective coupling means and a portable fire extinguishing apparatus, a double outlet coupling comprising a body having an inlet and two outlets, a double seating valve in said body adapted to control the communication from said inlet to said outlets, a spring in said body normally urging said valve to close one of the outlets, said valve, upon the application of the coupling means, being actuated against said spring to open the normally closed outlet and to close the other outlet.

6. The combination of a fluid medium distribution conduit, a portable container releasably confining a fluid medium, fluid medium discharge controlling means secured to said container providing two outlets therefor, one of which is adapted for connective coupling, said controlling means including valve means, valve actuating means associated with said valve means for normally closing said last named outlet and for opening the other outlet, and coupling means on said conduit adapted to couple said conduit to said normally closed outlet and to open said normally closed outlet and to close said normally open outlet.

7. A fluid medium flow controlling means comprising in combination a body member having an inlet and two outlets, a double seating valve member reciprocally movable in said body constructed and arranged to control said outlets and spring means in said body member adjacent said valve member normally urging it into closing position with respect to one of said outlets, said one outlet constituting a projecting substantially tubular portion on one side of said valve member to be engaged to actuate said valve member against said spring by means adapted to be coupled to said body member, said portion having openings for establishing communication between said inlet and said normally closed outlet.

8. For use with a conduit having coupling means, the combination of a container for a fluid medium, two-way-outlet means operatively connected to said container providing two discharge outlets therefor, a reciprocally movable double seating valve device associated with said outlet means and, actuating means for causing said valve device to normally close one of said outlets and open the other outlet, said valve device being adapted to be actuated, upon connection of the coupling means to said normally closed outlet, to open said normally closed outlet and close said other outlet.

9. In a fire extinguishing apparatus, the combination of a conduit, a portable container releasably confining a fire extinguishing medium, two-way-outlet means operatively connected to said container and providing two discharge outlets therefor, means for removably coupling said conduit to one of said outlets, a discharge horn operatively connected with said other outlet, valve means adapted for alternately opening one of said outlets and closing said other outlet, and means for positioning said valve means to open said other outlet and to close said one outlet.

10. In a fire extinguishing apparatus, the combination of a conduit, a portable container confining a fire extinguishing medium, a valve for controlling the release of the medium from said container, said valve having a discharge passage, two-way-outlet means operatively connected to said discharge passage and providing two discharge outlets therefor, means for removably coupling said conduit to one of said outlets, a discharge horn operatively connected with said other outlet, valve means adapted for alternately opening one of said outlets and closing said other outlet, and means for positioning said valve means to open said other outlet and to close said one outlet.

11. In a fire extinguishing apparatus, the combination of a conduit, a portable container releasably confining a fire extinguishing medium, two-way-outlet means operatively connected to said container and providing two discharge outlets therefor, coupling means for removably coupling said conduit to one of said outlets, a discharge horn member operatively connected with said other outlet and mounted for rotation with respect to said outlet means, valve means for alternately opening one of said outlets and closing said other outlet, said valve means being operable upon connection of said coupling means to open said one outlet and close said other outlet, and means for operating said valve means to close said one outlet and open said other outlet.

WALTER H. FREYGANG.